(12) United States Patent
Matsumura et al.

(10) Patent No.: US 7,763,358 B2
(45) Date of Patent: Jul. 27, 2010

(54) SILICONE EMULSION COMPOSITION AND WOOD TREATMENT

(75) Inventors: Kazuyuki Matsumura, Annaka (JP); Akira Yamamoto, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 376 days.

(21) Appl. No.: 11/634,837

(22) Filed: Dec. 7, 2006

(65) Prior Publication Data

US 2007/0134423 A1 Jun. 14, 2007

(30) Foreign Application Priority Data

Dec. 9, 2005 (JP) .............................. 2005-355798

(51) Int. Cl.
*B32B 21/08* (2006.01)

(52) U.S. Cl. ........................ 428/452; 524/404; 524/405; 524/366; 524/375; 524/378; 524/588; 427/297; 427/439; 528/31

(58) Field of Classification Search ........................ None
See application file for complete search history.

(56) References Cited

U.S. PATENT DOCUMENTS

| 4,229,507 | A | | 10/1980 | Kai et al. | |
|---|---|---|---|---|---|
| 4,304,820 | A | * | 12/1981 | Deubzer et al. | 428/452 |
| 4,433,007 | A | * | 2/1984 | Marwitz et al. | 427/515 |
| 5,534,305 | A | | 7/1996 | Fujiki et al. | |
| 5,695,551 | A | * | 12/1997 | Buckingham et al. | 106/2 |
| 6,403,163 | B1 | * | 6/2002 | Fisher et al. | 427/387 |
| 2004/0006167 | A1 | * | 1/2004 | Moore | 524/405 |
| 2006/0084738 | A1 | * | 4/2006 | Lopez et al. | 524/404 |

FOREIGN PATENT DOCUMENTS

| JP | 54-110234 A | 8/1979 |
|---|---|---|
| JP | 55-118044 A | 9/1980 |
| JP | 56-4408 A | 1/1981 |
| JP | 60-255866 A | 12/1985 |
| JP | 63-265601 A | 11/1988 |
| JP | 4-307204 A | 10/1992 |
| JP | 5-69412 A | 3/1993 |

* cited by examiner

*Primary Examiner*—Marc S Zimmer
(74) *Attorney, Agent, or Firm*—Birch, Stewart, Kolasch & Birch, LLP

(57) ABSTRACT

A silicone emulsion composition for wood treatment is prepared by emulsifying and dispersing (A) an organopolysiloxane having at least two SiH groups, (B) a surfactant, and (C) a curing catalyst in water to form a silicone emulsion, and adding (D) a boron compound to the silicone emulsion.

9 Claims, No Drawings

SILICONE EMULSION COMPOSITION AND WOOD TREATMENT

CROSS-REFERENCE TO RELATED APPLICATION

This non-provisional application claims priority under 35 U.S.C. §119(a) on Patent Application No. 2005-355798 filed in Japan on Dec. 9, 2005, the entire contents of which are hereby incorporated by reference.

TECHNICAL FIELD

This invention relates to a silicone emulsion composition in which a boron compound with rot-proof and termite-controlling functions is added to a silicone emulsion which crosslinks via SiH groups to form a coating. The silicone emulsion composition, when wood is treated therewith just once, effectively penetrates deep into the wood without damaging wooden quality; imparts water repellency, water absorption prevention, dimensional stability, rot-proofness and termite control to the wood; improves the leachability in water of the rot-proof/termite-controlling agent; and has shelf stability. The invention also relates to a method of treating wood with the composition.

BACKGROUND ART

While wood is widely utilized as building materials, crafted products and the like, it is a common practice that wood is coated or impregnated with various treating agents such as high-molecular weight compounds, low-molecular weight compounds, chemical agents and inorganic materials for the purpose of improving wood properties such as dimensional stability, and resistances to water, staining, fire, rotting, crazing and wear.

Among these agents, many attempts have been made to apply to wood the silicones which have been proven effective as modifiers for paints and resins with respect to water repellence and stain resistance. For example, JP-A 56-4408 discloses a method of coating a surface of wood with a composition comprising 100 pbw of a silicone diol having a relatively high viscosity and 0.1 to 50 pbw of a crosslinker, followed by curing. This method, however, detracts from the wooden quality on the wood surface, and has the drawback common to paints that the effect of protecting the wood interior disappears if the surface coating receives only a few flaws in the course of actual use of wood in various applications. When the above treatment is performed on the wood which has been internally impregnated with inorganic salts of phosphoric or boric acid serving as flame retardants or termite-controlling agents, undesirably the coating permits the inorganic salts to be readily leached out in rain water or the like.

Intending to apply the sol-gel method using silicon alkoxide to wood, JP-A 63-265601 discloses a method of preparing a modified wood by forming a silicone polymer within cell walls of wood. This method capable of forming a silicone polymer within wood has advantages that the wooden quality on the surface is not compromised and the effect lasts even after the wood surface flaws. However, catalysts such as hydrochloric acid or organometallic compounds must be used to promote curing because of the low reactivity of monomers, leaving the problems that preparation requires cumbersome operation and costs and the wood itself can be degraded by the catalyst.

Additionally, the silicone polymer forms via catalytic reaction while filling wood cell cavities therewith. Then it is effective for prohibiting water absorption to some extent, but less effective for improving dimensional stability.

Beside the silicone, SBR latex is coated to wood surface as the anti-crazing agent as disclosed in JP-A 54-110234. Due to poor stability over time, the latex coating degrades upon outdoor exposure, failing to prevent the chemical agents from being leached out.

As the anti-crazing paint for wood, JP-A 60-255866 describes a coating composition comprising an SBR or NBR latex and a polyalkylene oxide group-containing compound, which is coated to wood surface. The polyalkylene oxide group-containing compound is hydrophilic so that it is leached out upon exposure to weather over time, and the effect does not last.

JP-A 55-118044 discloses a wood treating composition having a low-volatile oligomer emulsified in water. JP-A 5-69412 discloses a wood treating composition comprising a water-soluble modifier and an emulsion. Both the low-volatile oligomer and the water-soluble modifier are hydrophilic compounds which can be leached out with the lapse of time, failing to maintain the desired effect. JP-A 4-307204 discloses a wood processing composition comprising a water-soluble filling/curing agent which cures after having penetrated into wood so that it prevents chemical agents from being leached out and restrains the wood from shrinkage. The water-soluble filling/curing agent comprising volatile reagents such as urea and formalin requires careful management of the working environment, and the effect of preventing leaching-out is insufficient due to water solubility.

Another approach is to substitute a water-soluble solvent such as polyethylene glycol for the bound water in cell membranes. However, the solvent once substituted will be leached out over time due to its water solubility.

The above-discussed technology relates to surface treating agents for treating wood having rot-proof and termite controlling agents already impregnated therein. Then at least two steps are involved, and so the overall process is cumbersome and uneconomical.

SUMMARY OF THE INVENTION

An object of the present invention is to provide a silicone emulsion composition which imparts water repellency, water absorption prevention, dimensional stability, rot-proofness and termite control to wood to the depth through a single treatment, and minimizes the leachability in water of a rot-proof/termite-controlling agent; a method of treating wood using the composition.

The inventors have found that the above and other objects are achieved when a boron compound is added to a silicone emulsion comprising the following components (A), (B) and optionally (C) emulsified and dispersed in water, which crosslinks via SiH groups to form a coating. Unexpectedly, the boron compound can be effectively admixed with the silicone emulsion in a stable manner, and the resulting silicone emulsion composition imparts water repellency, water absorption prevention, dimensional stability, rot-proofness and termite control to wood to the depth through a single treatment, and minimizes the leachability in water of the rot-proof/termite-controlling agent.

The present invention provides a silicone emulsion composition comprising a silicone emulsion comprising (A) 100 parts by weight of an organopolysiloxane having at least two silicon-bonded hydrogen atoms on the molecule, (B) 0.5 to 20 parts by weight of a surfactant, and (C) 0 to 30 parts by weight of a curing catalyst emulsified and dispersed in water, the composition further comprising (D) a boron compound added to the silicone emulsion in an amount of 0.1 to 300 parts by weight per 100 parts by weight as solids of the silicone emulsion. Typically, the boron compound (D) is a boric acid salt.

In another embodiment, wood is treated with the silicone emulsion composition by surface treatment, immersion treatment, or vacuum or pressure impregnation, and then heat treated at 50 to 150° C.

BENEFITS OF THE INVENTION

By treating wood just once, the silicone emulsion composition of the invention imparts excellent properties including water repellency, water absorption prevention, dimensional stability, rot-proofness and termite control to the surface and the interior of the wood without damaging the wooden quality. The composition minimizes the leachability in water of the rot-proof/termite-controlling agent.

DESCRIPTION OF THE PREFERRED EMBODIMENTS

Silicone Emulsion

A. SiH-Containing Organopolysiloxane

Component (A), which serves as a base of the inventive composition, is an organopolysiloxane having at least two silicon-bonded hydrogen atoms (i.e., SiH groups) on the molecule, the number of SiH groups being preferably from 5 to 50.

The organopolysiloxanes (A) may be either linear or cyclic. The organopolysiloxanes may have, in part, a branched structure as long as the objects of the invention are not impaired.

The linear organopolysiloxanes include those of the general formula (1).

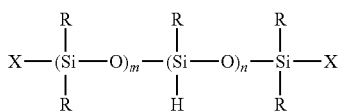

(1)

Herein R is independently at each occurrence a substituted or unsubstituted monovalent hydrocarbon group of 1 to 20 carbon atoms, preferably 1 to 6 carbon atoms, exclusive of aliphatic unsaturated groups, X is independently at each occurrence a hydrogen atom or the same group as R, m is an integer of 1 to 10,000, preferably 1 to 1,000, n is an integer of 0 to 1,000, preferably 0 to 100, and the sum of m+n is an integer of 1 to 11,000, preferably 1 to 1,100, with the proviso that when n=0, both X are hydrogen, and when n=1, at least one X is hydrogen.

The cyclic organopolysiloxanes include those of the general formula (2).

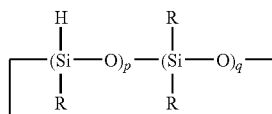

(2)

Herein R is independently at each occurrence a substituted or unsubstituted monovalent hydrocarbon group of 1 to 20 carbon atoms, preferably 1 to 6 carbon atoms, exclusive of aliphatic unsaturated groups, p is an integer of 2 to 10, preferably 2 to 5, q is an integer of 0 to 8, preferably 0 to 5, and the sum of p+q is an integer of 3 to 10, preferably 3 to 8.

More particularly, in formulae (1) and (2), examples of R include alkyl groups such as methyl, ethyl, propyl, isopropyl, butyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl; aryl groups such as phenyl, o-, m- and p-tolyl, 1-, 2-naphthyl, and 3-, 4-biphenyl; aralkyl groups such as benzyl and 2-phenylethyl; substituted forms of the foregoing in which one or more hydrogen atoms are substituted by halogen atoms like chlorine, bromine and fluoride, such as fluoromethyl, 3-fluoropropyl and 3,3,3-trifluoropropyl. Of these, methyl is preferred. It is also preferred that at least 90 mol % of the entire R be methyl.

If m in formula (1) exceeds 10,000 or m+n exceeds 11,000, the resulting emulsion may lose dispersion stability. It is difficult to prepare organopolysiloxanes of formula (1) wherein n is in excess of 1,000.

Illustrative, non-limiting examples of suitable organopolysiloxanes of formula (1) are given below. Note that Me stands for methyl.

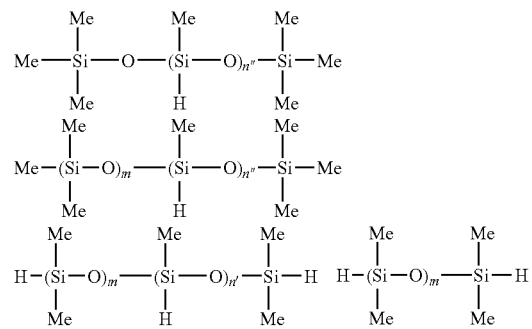

Herein, m is an integer of 1 to 10,000, n" is an integer of 2 to 1,000, and n' is an integer of 1 to 1,000.

Illustrative, non-limiting examples of suitable cyclic organopolysiloxanes of formula (2) are given below.

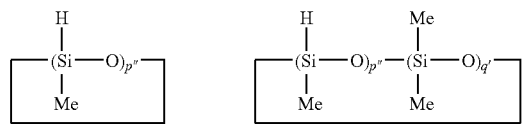

Herein, p" is an integer of 3 to 10, p' is an integer of 2 to 9, q' is an integer of 1 to 8, and p'+q' is an integer of 3 to 10.

The organopolysiloxanes may be used alone or in admixture of two or more as component (A). Also acceptable is a combination of a linear organopolysiloxane and a cyclic organopolysiloxane.

B. Surfactant

A surfactant is used as component (B) for forming an aqueous emulsion containing component (A). The surfactant used herein is not particularly limited and any well-known surfactants may be used. Suitable surfactants include anionic surfactants such as alkyl sulfuric acid salts, alkylbenzene sulfonic acid salts, and alkyl phosphoric acid salts; nonionic surfactants such as polyoxyethylene alkyl ethers, polyoxyethylene alkylphenyl ethers and polyoxyethylene fatty acid esters; cationic surfactants such as quaternary ammonium salts and alkylamine acetates; and ampholytic surfactants such as alkyl betaines and alkyl imidazolines.

Of these, nonionic surfactants such as polyoxyethylene alkyl ethers and polyoxyethylene alkylphenyl ethers are preferred for the dispersion stability of the silicone emulsion. Illustrative examples of the nonionic surfactants include polyoxyethylene octyl ether, polyoxyethylene nonyl ether, polyoxyethylene decyl ether, polyoxyethylene lauryl ether, polyoxyethylene tridecyl ether, polyoxyethylene myristyl ether, polyoxyethylene cetyl ether, polyoxyethylene stearyl ether, polyoxyethylene octylphenyl ether, polyoxyethylene nonylphenyl ether, and polyoxyethylene styrenic phenyl ether.

The surfactants may be used alone or in admixture of two or more as component (B).

In the emulsion, component (B) is present in an amount of 0.5 to 20 parts by weight, preferably 1 to 15 parts by weight per 100 parts by weight of component (A). With too small amounts of component (B) outside the range, it is difficult to obtain an emulsion. Too large amounts of component (B) interfere with the water repellency of a cured coating on a substrate resulting from crosslinking/curing reaction of component (A).

C. Curing Catalyst

Component (C), which is optional, is a curing catalyst for inducing condensation reaction of the components of the composition for achieving quick crosslinking and curing. Suitable catalysts include metal salts of organic acids such as dibutyltin dilaurate, dibutyltin dioctate, dioctyltin dilaurate, dioctyltin diacetate, dibutyltin bisoleylmaleate, tin octylate, zinc stearate, zinc octylate, zinc acetate and iron octylate; platinum compounds; and amine compounds such as n-hexylamine and guanidine. These curing catalysts except water-soluble ones are desirably emulsified and dispersed in water with the aid of surfactants to form emulsions, prior to use.

An appropriate amount of component (C) is 0 to 30 parts by weight per 100 parts by weight of component (A). If more than 30 parts of the catalyst is used, a portion thereof can be left in the coating as non-volatile matter and adversely affect the coating properties. The preferred amount of component (C) is 0 to 20 parts by weight. When used, the amount of component (C) is preferably at least 0.5 part by weight.

The silicone emulsion is prepared from the above-described components by any well-known emulsification techniques. For example, the components are admitted into water (pure water, deionized water, etc.) and fully agitated or otherwise processed on a suitable equipment such as a homomixer, homogenizer or colloid mill until a homogeneous stable emulsion is obtained. A pH adjusting agent may be added, if necessary.

At this stage, water is preferably used in such amounts that the resulting emulsion has a solids concentration of 10 to 80% by weight, more preferably 40 to 60% by weight.

Silicone Emulsion Composition

D. Boron Compound

According to the invention, (D) a boron compound is added to and mixed with the silicone emulsion in an amount of 0.1 to 300 parts by weight per 100 parts by weight as solids of the silicone emulsion to formulate a silicone emulsion composition. The boron compound imparts rot-proof and termite-controlling properties to wood.

Suitable boron compounds include boric acid, borax, borates ($Na_2B_8O_{13}.4H_2O$) such as Tim-bor® available from U.S. Borax Inc., and trialkyl borates such as trimethyl borate, triethyl borate, tripropyl borate and tributyl borate. Of these, borax and borates such as Tim-bor® are preferred.

The amount of the boron compound (D) compounded is 0.1 to 300 parts by weight, preferably 10 to 200 parts by weight, more preferably 30 to 150 parts by weight per 100 parts by weight as solids of the silicone emulsion. Less than 0.1 pbw of component (D) achieves less rot-proof and termite-controlling effects whereas more than 300 pbw detracts from the emulsion stability.

In combining the silicone emulsion with component (D), it is preferred that component (D) be dissolved in water and in the aqueous solution form added to and mixed with the silicone emulsion. In this preferred procedure, the amount of water in which component (D) is dissolved is such that the concentration of component (D) is at least 10% by weight.

In the silicone emulsion composition thus obtained, silane coupling agents, silicone resins, silicone oils, or powdered silicone resins may be added and compounded, if desired, for further improving the properties of a coating thereof, as long as the objects of the invention are not compromised. Suitable silane coupling agents include various silanes having acryloxy, methacryloxy, mercapto, carboxyl and cyano groups. Suitable silicone resins are trialkylsiloxypolysilicates. Suitable silicone oils include α,ω-dihydroxyalkylpolysiloxanes and alkylpolysiloxanes. Suitable powdered silicone resins include silicone resin powder and silicone rubber powder.

In the silicone emulsion composition, various additives may be compounded if desired, such as, for example, thickeners, pigments, dyes, penetrants, antistatic agents, antifoaming agents, flame retardants, antibacterial agents, and water repellents.

The wood which can be treated with the silicone emulsion composition of the invention is not particularly limited and encompasses a variety of woods including solid wood, plywood, laminated veneer lumbers (LVL), and particle boards.

A coating of the silicone emulsion composition of the invention exhibits minimized water absorption and good water repellency. The coating is thus effective in preventing the rot-proof/termite-controlling agent from being leached out in water, typically rain water.

The method of applying the silicone emulsion composition of the invention is not particularly limited. Well-known methods that can be used herein include surface treatment such as brush coating, roll coating, and spray coating, immersion treatment, and vacuum or pressure impregnation. Once the silicone emulsion composition is applied to wood, it is dried at elevated temperatures, forming a cured coating. Suitable heating conditions include a temperature of 50 to 150° C., preferably 80 to 120° C. and a time of 0.5 to 48 hours, preferably 2 to 24 hours. It is believed that the coating acquires the desired properties of water repellency and water absorption prevention through the mechanism that on heating, crosslinking reaction occurs between SiH groups and OH groups on cellulose in wood, or SiH groups on the organopolysiloxane in the silicone emulsion composition are once hydrolyzed into Si—OH groups, which react with OH groups on cellulose in wood.

EXAMPLE

Preparation Examples, Examples and Use Examples are given below for further illustrating the present invention. These examples should not be construed as limiting the invention.

Preparation Example 1

A 2-L polyethylene vessel was charged with 600 g of an SiH-containing organopolysiloxane of the formula:

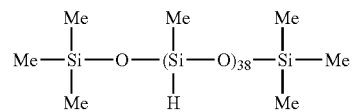

as component (A) and 15 g of polyoxyethylene (7) decyl ether as component (B). While the contents were agitated by a homomixer, 385 g of deionized water was slowly added. The mixture was worked on a homogenizer at 30 MPa. Then 0.1 g of acetic acid was added for pH adjustment, obtaining silicone emulsion E-1.

Preparation Example 2

A 2-L polyethylene vessel was charged with 600 g of an SiH-containing organopolysiloxane of the formula:

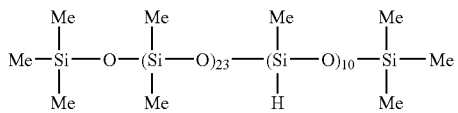

as component (A) and 15 g of polyoxyethylene (7) decyl ether as component (B). While the contents were agitated by a homomixer, 360 g of deionized water was slowly added. The mixture was worked on a homogenizer at 30 MPa. Then 0.1 g of acetic acid was added for pH adjustment, obtaining silicone emulsion E-2.

Preparation Example 3

A borate ($Na_2B_8O_{13}.4H_2O$) available as Tim-bor® from U.S. Borax Inc., 15 g, was combined with and dissolved in 85 g of deionized water, forming a 15% aqueous solution of the borate as component (D).

Examples 1-6

Silicone emulsion compositions #1 to #6 (Examples 1 to 6) were prepared by adding and mixing component (D) with the silicone emulsion E-1 or E-2. The mixing formulation is shown in Table 1. These compositions were held for 3 months at room temperature, after which their stability was examined. The liquid is rated good (○) for no appearance change, fair (Δ) for some separation, and poor (X) for precipitation and separation. The results are also shown in Table 1.

Water Absorption Test

The samples were entirely immersed in water for 24 hours, after which they were taken out and weighed. A percent water absorption was calculated according to the equation:

$$\% \text{ water absorption} = [(W - W0)/W0] \times 100$$

wherein W0 is the weight (g) of the sample before water immersion and W is the weight (g) of the sample immediately after water immersion. An average of three samples was reported.

Use Examples 2 to 6

Using Silicone emulsion compositions #2 to #6, a water absorption test was carried out as in Use Example 1. The results are shown in Table 2.

Comparative Use Example 1

Using untreated cedar sap wood pieces of the same size as in Use Example 1, a water absorption test was carried out as in Use Example 1. The results are shown in Table 2.

Comparative Use Example 2

Using the 15% aqueous solution of borate as component (D), test samples were prepared as in Use Example 1. A water absorption test was similarly carried out. The results are shown in Table 2.

Comparative Use Example 3

A reactor equipped with a thermometer, stirrer, reflux condenser and addition funnel was charged with 2.0 g of a reactive emulsifier (Adeka Reasoap SE-10N, Asahi Denka Co., Ltd.) and 342.1 g of water and heated to a temperature of 75° C. An emulsion was prepared by adding 2.0 g of a reactive emulsifier (Adeka Reasoap SE-10N, Asahi Denka Co., Ltd.) to 244.5 g of water, dissolving the emulsifier, further adding a mixture of unsaturated monomers: 230 g of 2-ethylhexyl

TABLE 1

| Formulation (pbw) | Example | | | | | |
| --- | --- | --- | --- | --- | --- | --- |
| | 1 (SEC#1) | 2 (SEC#2) | 3 (SEC#3) | 4 (SEC#4) | 5 (SEC#5) | 6 (SEC#6) |
| Emulsion E-1 (solids) | 100 | 100 | 100 | | | |
| Emulsion E-2 (solids) | | | | 100 | 100 | 100 |
| 15% (D) in water | 300 | 700 | 150 | 300 | 700 | 150 |
| Shelf stability after 3 months | ○ | ○ | ○ | ○ | ○ | ○ |

Note:
SEC is Silicone emulsion composition.

Use Example 1

Three cedar sap wood pieces (air dried) of 1.4 cm×3 cm×3 cm (butt end 1.4×3 cm) were immersed in Silicone emulsion composition #1 at normal temperature and atmospheric pressure for 10 minutes and dried at 25° C. for 7 days and then at 105° C. for one day, obtaining modified wood pieces. A water absorption test was carried out on these samples as follows. The results are shown in Table 2.

acrylate, 230 g of styrene, 19 g of glycidyl methacrylate, and 12.5 g of methacrylic acid, and stirring the contents for emulsification. This emulsion was charged to the addition funnel. A 5% portion of this monomer mixture emulsion was transferred to the reactor, and 0.5 g of potassium persulfate added as a polymerization initiator, after which the reactor was heated to 80° C. and held for 10 minutes. Thereafter, the remainder of the monomer mixture emulsion and 50.0 g of 3% potassium persulfate were evenly added dropwise to the reactor over 3 hours. After the completion of addition, the mixture was held at 80° C. for one hour for maturing reaction. It was cooled to room temperature and neutralized with 3.5 g of aqueous ammonia. There was obtained Emulsion E-3 having a solids concentration of 45%. To 100 parts of Emulsion E-3 was added 300 parts of the 15% aqueous solution of borate as component (D). After mixing, however, precipitates settled out in the liquid.

TABLE 2

Water absorption after 24 hours

| | Treating agent | Water absorption (%) |
|---|---|---|
| Use Example 1 | SEC#1 | 20 |
| Use Example 2 | SEC#2 | 23 |
| Use Example 3 | SEC#3 | 18 |
| Use Example 4 | SEC#4 | 19 |
| Use Example 5 | SEC#5 | 20 |
| Use Example 6 | SEC#6 | 17 |
| Comparative Use Example 1 | — | 123 |
| Comparative Use Example 2 | 15% (D) in water | 145 |

Note:
SEC is Silicone emulsion composition.

Use Example 7

Nine cedar sap wood pieces having a butt section of 20 mm×20 mm and a height of 10 mm with opposed sides of straight grain were immersed in a 10-fold dilution in deionized water of Silicone emulsion composition #1 of Example 1 under reduced pressure for 2 hours, and dried at 25° C. for 7 days and then at 105° C. for one day, obtaining test wood pieces.

A leach-out test was carried out on these samples according to JIS K1571. The amount of residual borate was determined by measuring the amount of boron in the samples after the test by the following procedure. The results are shown in Table 3.

Leach-Out Test

A set of nine wood samples was placed in a 500-ml beaker, to which deionized water in a volume which was 10 times the volume of the samples was poured so that the samples were submerged under the water surface. By installing a magnetic stirrer and rotating the stir bar at 400-450 rpm, the water was stirred at a temperature of 25° C. for 8 hours for leaching out the chemical. Immediately thereafter, the samples were taken out and lightly drained of water from the surface. Subsequently, the samples were held in an air circulating dryer at a temperature of 60° C. for 16 hours, allowing the volatiles to volatilize off. The foregoing procedure was repeated ten times.

Measurement of Residual Borate in Sample

The wood sample was placed in a Teflon® beaker, which received 50 ml of 3% aqueous nitric acid and was heated on a hot plate at 200° C. for 2 hours. The beaker was cooled down, after which water was added to a constant volume of 50 ml. This procedure was repeated five times. At the end of every procedure, the amount of boron was measured by an ICP analyzer. The total of these amounts is the amount of residual borate in the wood sample. The result is an average of nine samples.

Use Examples 8 to 12

The leach-out test and the residual borate measurement were carried out as in Use Example 7, using 10-fold dilutions in deionized water of Silicone emulsion compositions #2 to #6. The results are shown in Table 3.

Comparative Use Example 4

The leach-out test and the residual borate measurement were carried out as in Use Example 7, using the 15% aqueous solution of borate as component (D). The results are shown in Table 3.

TABLE 3

| | Treating agent | Amount of residual borate (kg/m$^3$) |
|---|---|---|
| Use Example 7 | SEC#1 | 2.1 |
| Use Example 8 | SEC#2 | 2.5 |
| Use Example 9 | SEC#3 | 1.9 |
| Use Example 10 | SEC#4 | 2.2 |
| Use Example 11 | SEC#5 | 2.5 |
| Use Example 12 | SEC#6 | 2.0 |
| Comparative Use Example 4 | 15% (D) in water | 0.01 |

Japanese Patent Application No. 2005-355798 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone emulsion composition for treating wood consisting of the following components (A) to (D) and water:
   (A) 100 parts by weight of an organopolysiloxane having at least two silicon-bonded hydrogen atoms on the molecule or a mixture of said organopolysiloxanes,
   (B) 0.5 to 20 parts by weight of a surfactant or a mixture of surfactants,
   (C) 0 to 30 parts by weight of a curing catalyst, and
   (D) a boric acid salt,
   wherein said components (A) to (C) being emulsified and dispersed in water to form a silicone emulsion, and
   said boric acid salt (D) being added to said silicone emulsion in an amount of 10 to 300 parts by weight per 100 parts by weight as solids of said silicone emulsion.

2. A method of treating wood, comprising the steps of treating wood with the silicone emulsion composition of claim 1 by surface treatment, immersion treatment, or vacuum or pressure impregnation, and heat treating the treated wood at 50 to 150° C.

3. A wood treated with the silicone emulsion composition of claim 1.

4. The silicone emulsion composition of claim 1, wherein said surfactant is a nonionic surfactant selected from the group consisting of polyoxyethylene alkyl ethers and polyoxyethylene alkylphenyl ethers.

5. The silicone emulsion composition of claim 1, wherein said surfactant is a nonionic surfactant selected from the group consisting of polyoxyethylene alkyl ethers, polyoxyethylene alkylphenyl ethers and mixtures thereof.

6. A coating of the silicone emulsion composition of claim 1.

7. A silicone emulsion composition for treating wood consisting of the following components:
   (A) 100 parts by weight of an organopolysiloxane having at least two silicon-bonded hydrogen atoms on the molecule or a mixture of said organopolysiloxanes, (B) 0.5 to 20 parts by weight of a surfactant or a mixture of surfactants,
(C) 0 to 30 parts by weight of a curing catalyst,
(D) a boron compound,
(E) at least one component selected from the group consisting of silicone resins, silicone oils, powdered silicone resins, thickeners, pigments, dyes, antistatic agents, antifoaming agents, flame retardants, antibacterial agents and water repellents, and
(F) water,
wherein said components (A) to (C) being emulsified and dispersed in water to form a silicone emulsion, and
said boron compound (D) being added to said silicone emulsion in an amount of 0.1 to 300 parts by weight per 100 parts by weight as solids of said silicone emulsion.

8. The silicone emulsion composition of claim 7, wherein the boron compound (D) is a boric acid salt.

9. A silicone emulsion composition for treating wood consisting of the following components (A) to (E) and water:

(A) 100 parts by weight of an organopolysiloxane having at least two silicon-bonded hydrogen atoms on the molecule or a mixture of said organopolysiloxanes,
(B) 0.5 to 20 parts by weight of a surfactant or a mixture of surfactants,
(C) 0 to 30 parts by weight of a curing catalyst,
(D) a boric acid salt, and
(E) at least one component selected from the group consisting of silicone resins, silicone oils, powdered silicone resins, thickeners, pigments, dyes, penetrants, antistatic agents, antifoaming agents, flame retardants, antibacterial agents and water repellents,
wherein said components (A) to (C) being emulsified and dispersed in water to form a silicone emulsion, and
said boron acid salt (D) being added to said silicone emulsion in an amount of 10 to 300 parts by weight per 100 parts by weight as solids of said silicone emulsion.

* * * * *